(12) United States Patent
Van Der Velde et al.

(10) Patent No.: US 12,127,285 B2
(45) Date of Patent: Oct. 22, 2024

(54) REFERENCE FEATURE SETS IN A TELECOMMUNICATION NETWORK

(71) Applicant: Samsung Electronics Co., Ltd., Suwon-si (KR)

(72) Inventors: Himke Van Der Velde, Staines (GB); Yinan Qi, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 589 days.

(21) Appl. No.: 17/289,988

(22) PCT Filed: Nov. 4, 2019

(86) PCT No.: PCT/KR2019/014848
§ 371 (c)(1),
(2) Date: Apr. 29, 2021

(87) PCT Pub. No.: WO2020/091562
PCT Pub. Date: May 7, 2020

(65) Prior Publication Data
US 2021/0400755 A1    Dec. 23, 2021

(30) Foreign Application Priority Data

Nov. 2, 2018 (GB) ..................... 1817925
Nov. 2, 2018 (GB) ..................... 1817967
Nov. 1, 2019 (GB) ..................... 1915888

(51) Int. Cl.
*H04W 76/16* (2018.01)
*H04L 5/00* (2006.01)
(Continued)

(52) U.S. Cl.
CPC ........... *H04W 76/16* (2018.02); *H04L 5/0051* (2013.01); *H04W 72/0446* (2013.01); *H04W 72/0453* (2013.01); *H04W 72/23* (2023.01)

(58) Field of Classification Search
None
See application file for complete search history.

(56) References Cited

U.S. PATENT DOCUMENTS

2010/0273506 A1   10/2010   Stern-Berkowitz et al.
2012/0122440 A1    5/2012   Krishnamurthy et al.
(Continued)

FOREIGN PATENT DOCUMENTS

EP         3616456 A1      3/2020
WO     2016/163943 A1     10/2016
(Continued)

OTHER PUBLICATIONS

Ericsson, "Relation of feature sets and band combinations", 3GPP TSG-RAN WG2 #103bis, Oct. 8-12, 2018, Tdoc R2-1814979, 6 pages.
(Continued)

*Primary Examiner* — Alex Skripnikov

(57) ABSTRACT

The disclosure relates to a pre-5th-Generation (5G) or 5G communication system to be provided for supporting higher data rates Beyond 4th-Generation (4G) communication system such as long term evolution (LTE). Disclosed is a method of operating a telecommunication network, in communication with a User Equipment, UE, comprising the use of Feature Sets, FS, wherein the telecommunication network is operable in a Dual Connectivity, DC, mode to support a first Radio Access Technology, RAT, and a second RAT, comprising the step of: the UE providing a UE capability container including a list of supported Band Combinations, BCs, for which Carrier Aggregation, CA, is supported.

12 Claims, 13 Drawing Sheets

(51) Int. Cl.
 *H04W 72/0446* (2023.01)
 *H04W 72/0453* (2023.01)
 *H04W 72/23* (2023.01)

(56) References Cited

U.S. PATENT DOCUMENTS

| | | | |
|---|---|---|---|
| 2013/0122930 A1 | 5/2013 | Woo et al. | |
| 2013/0308567 A1 | 11/2013 | Chen et al. | |
| 2017/0026798 A1 | 1/2017 | Prevatt | |
| 2019/0074946 A1 | 3/2019 | Xue et al. | |
| 2019/0200406 A1* | 6/2019 | Henttonen | H04W 28/0268 |
| 2019/0342890 A1* | 11/2019 | Tong | H04W 76/27 |

FOREIGN PATENT DOCUMENTS

| | | |
|---|---|---|
| WO | 2017/190274 A1 | 11/2017 |
| WO | 2018/214981 A1 | 11/2018 |
| WO | 2019/231384 A1 | 12/2019 |

OTHER PUBLICATIONS

ZTE Corporation, "Correlated UE capability report in EN-DC and MR-DC/5GC", 3GPP TSG-RAN WG2 Meeting #101, Feb. 26-Mar. 2, 2018, R2-1802054, 5 pages.

Intel Corporation, "Updates on UE capabilities", Change Request, 3GPP TSG-RAN WG2#101, Feb. 26-Mar. 2, 2018, R2-1802969, 14 pages.

Huawei et al., "Introduction of including EUTRA UE capability for MRDC usage", 3GPP TSG-RAN WG2 #103bis, Oct. 8-12, 2018, R2-1815137, 9 pages.

International Search Report dated Feb. 20, 2020 in connection with International Patent Application No. PCT/KR2019/014848, 6 pages.

Written Opinion of the International Searching Authority dated Feb. 20, 2020 in connection with International Patent Application No. PCT/KR2019/014848, 9 pages.

Search Report dated Mar. 29, 2019 in connection with United Kingdom Patent Application No. GB1817925.9, 2 pages.

Search Report dated Mar. 30, 2020 in connection with United Kingdom Patent Application No. GB1915888.0, 2 pages.

Qualcomm Incorporated, "Report on Email discussion [101#41][NR]", 3GPP TSG-RAN WG2#101bis, Apr. 16-20, 2018, R2-1806350, 42 pages.

"3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0 (Sep. 2018), 918 pages.

Supplementary European Search Report dated Sep. 22, 2021 in connection with European Application No. 19877973.8, 9 pages.

Ericsson, "Correction to UE capability procedures [103bis-23]," R2-18xxxxx, 3GPP TSG-RAN2 Meeting #104, Spokane, USA, Nov. 12-16, 2018, 64 pages.

Ericsson, "Email discussion 103bis#23: Relation of feature sets and band combinations," Tdoc R2-18xxxxx, 3GPP TSG-RAN WG2 #103bis, Chengdu, China, Oct. 8-12, 2018, 17 pages.

Office Action issued Jan. 21, 2024, in connection with Korean Patent Application No. KR10-2021-7016461, 10 pages.

* cited by examiner

[Fig. 1]
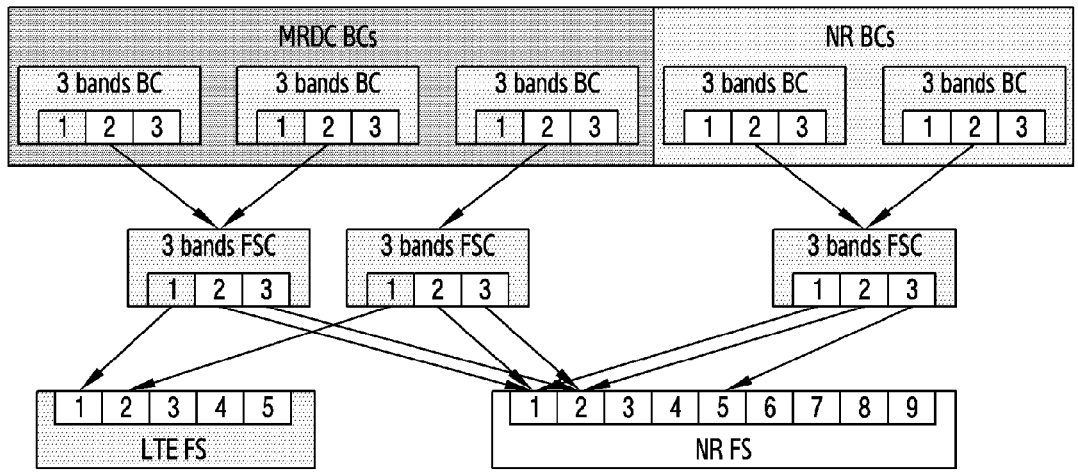
[Fig. 2]
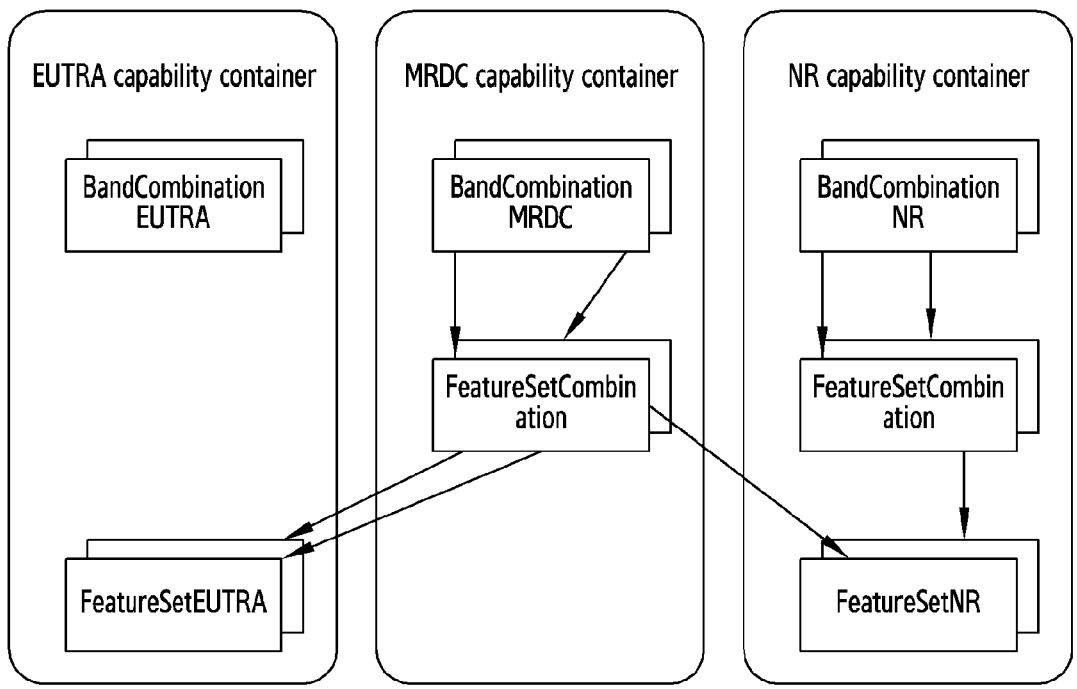

[Fig. 3]
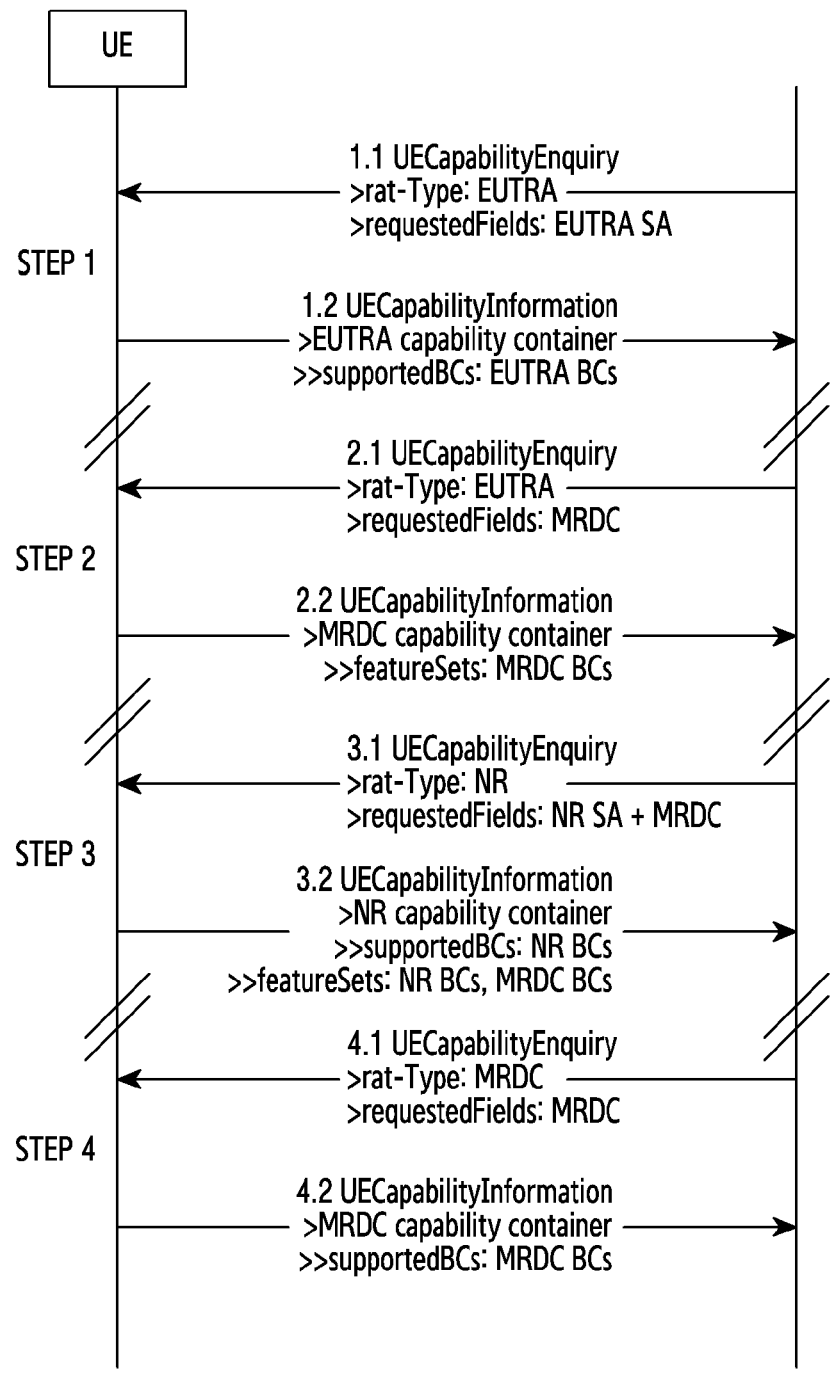

[Fig. 4]
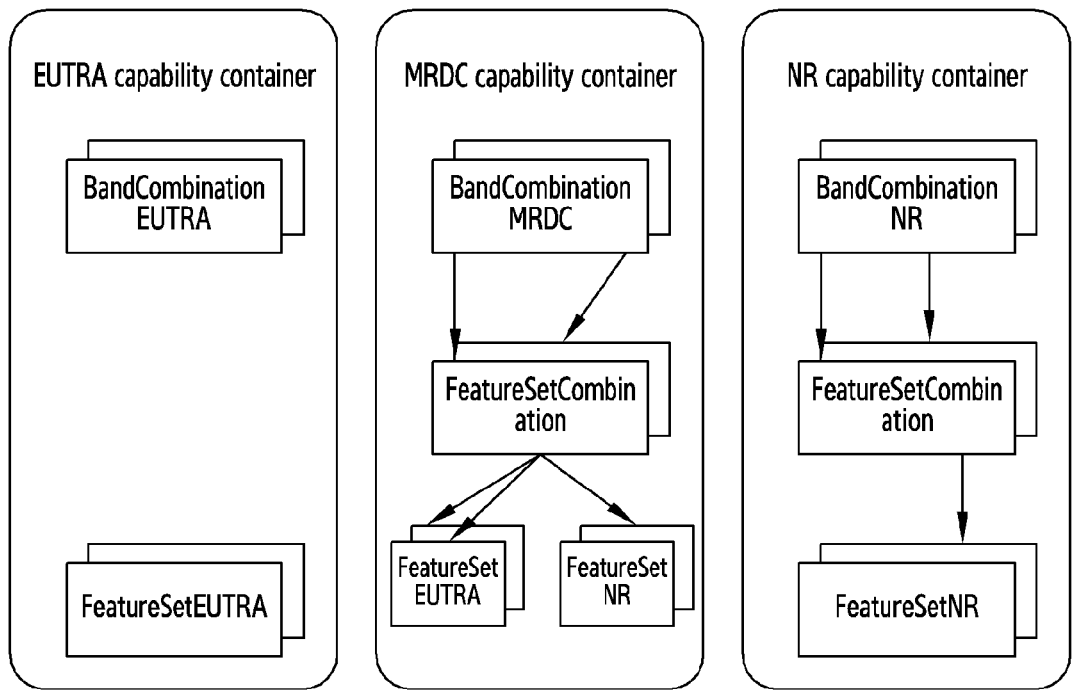
[Fig. 5]
| Option 1 | | | Option 2 | | | |
|---|---|---|---|---|---|---|
| Case | reqFreqMRDC | MRDC-only | Case | reqFreqMRDC | MRDC-only | MRDC-also |
| SA | no | don't care | SA | no | don't care | no |
| MRDC only | yes | yes | MRDC only | optional | yes | yes |
| Both | yes | no | Both | optional | no | yes |

[Fig. 6]

| EN-DC BCs | | | | |
|---|---|---|---|---|
| LTE bands | | NR bands | | |
| L1 | L2 | N1 | N2 | N3 |
| FS-L1 | | | | |
| | FS-L1 | | | |
| FS-L2 | FS-L2 | | | |
| | | FS-N1 | | |
| | | | FS-N1 | |
| | | | | FS-N1 |
| | | FS-N1 | FS-N1 | |
| | | FS-N1 | | FS-N1 |
| | | | FS-N2 | FS-N2 |
| | | FS-N1 | FS-N2 | FS-N2 |
| FS-L2 | | FS-N2 | | |
| FS-L1 | | | FS-N1 | |
| FS-L1 | | | | FS-N1 |
| FS-L2 | | FS-N2 | FS-N1 | |
| FS-L2 | | FS-N2 | | FS-N1 |
| FS-L1 | | | FS-N2 | FS-N2 |
| FS-L2 | | FS-N2 | FS-N2 | FS-N3 |

[Fig. 7A]

| Feature sets, ex1 | | |
|---|---|---|
| Total | NR | MRDC |
| FS-N1 | 1 | 1 |
| FS-N2 | 2 | 2 |
| FS-N3 | NA | 3 |

[Fig. 7B]
| Feature sets, ex2 | | |
|---|---|---|
| Total | NR | MRDC |
| FS-N1 | 1 | 1 |
| FS-N2 | 2 | 2 |
| FS-N3 | 3 | NA |
| FS-N4 | 4 | NA |
| FS-N5 | NA | 3 |
| FS-N6 | 5 | 4 |
| FS-N7 | NA | 5 |
| FS-N8 | NA | 6 |
[Fig. 8]
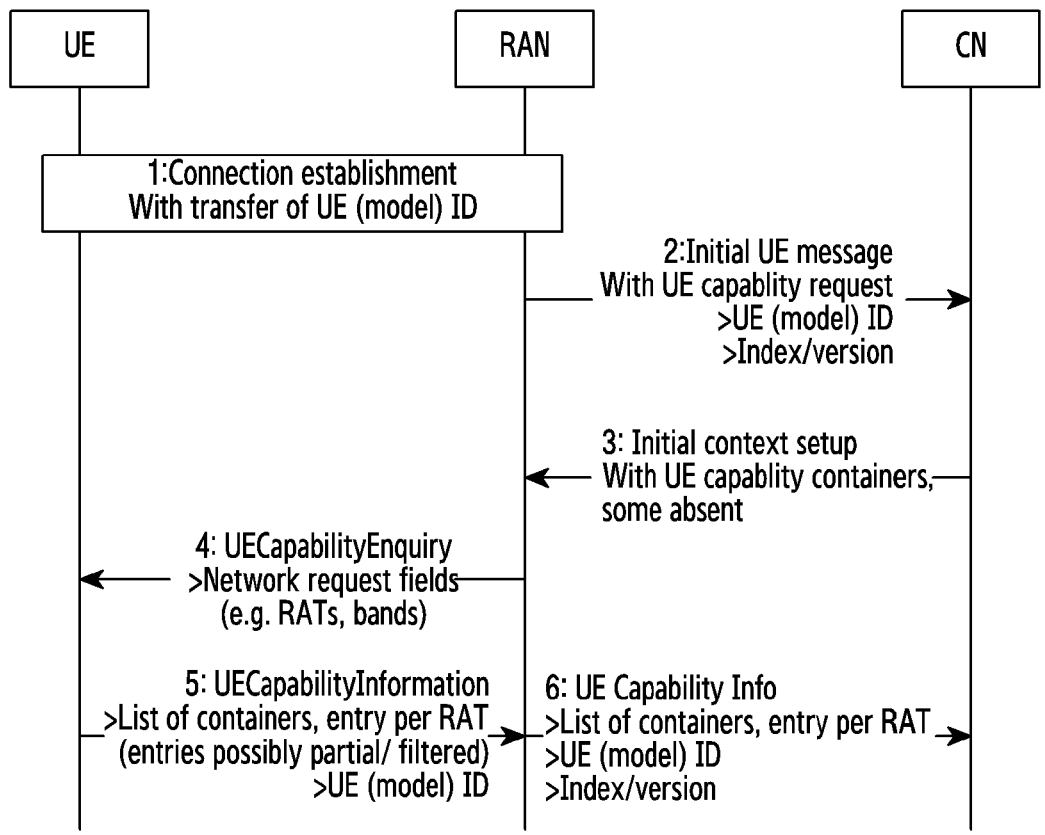

[Fig. 9]
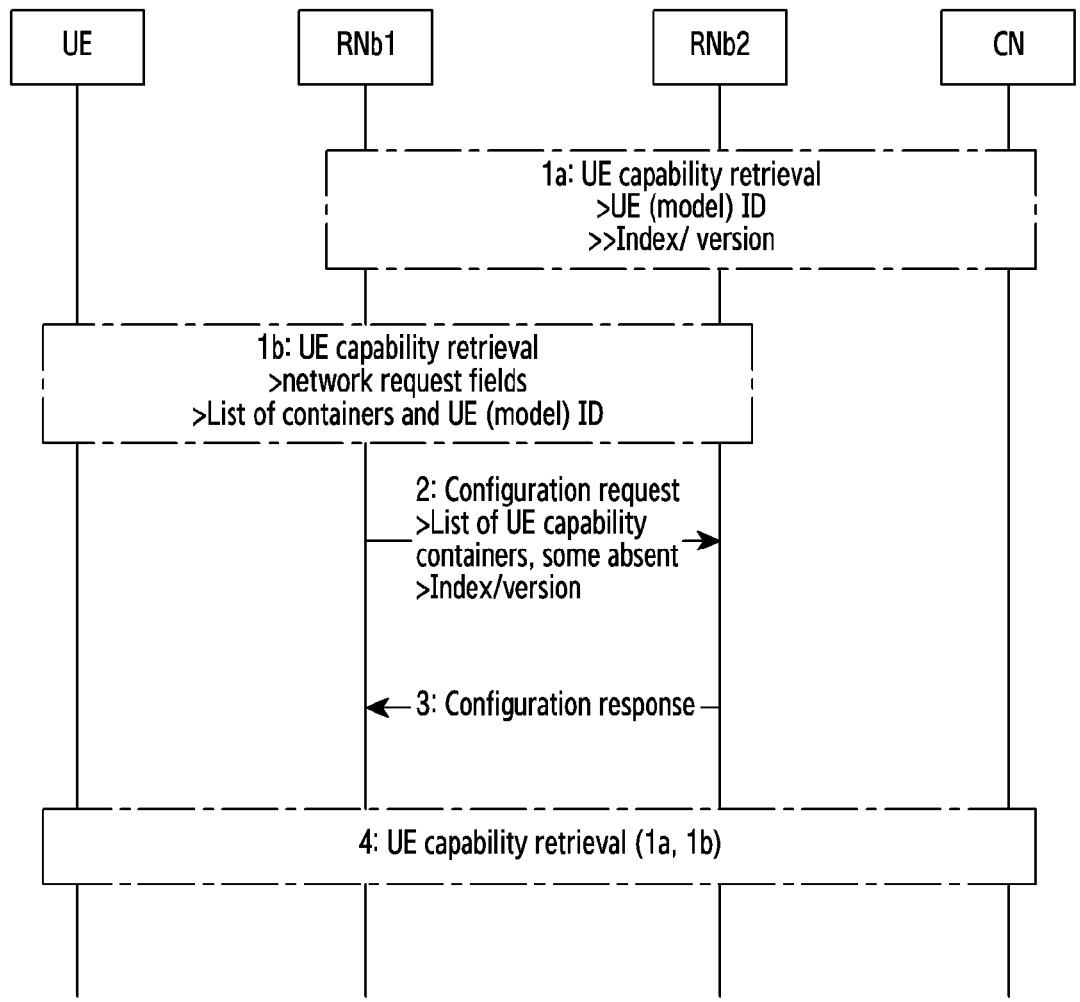

[Fig. 10]
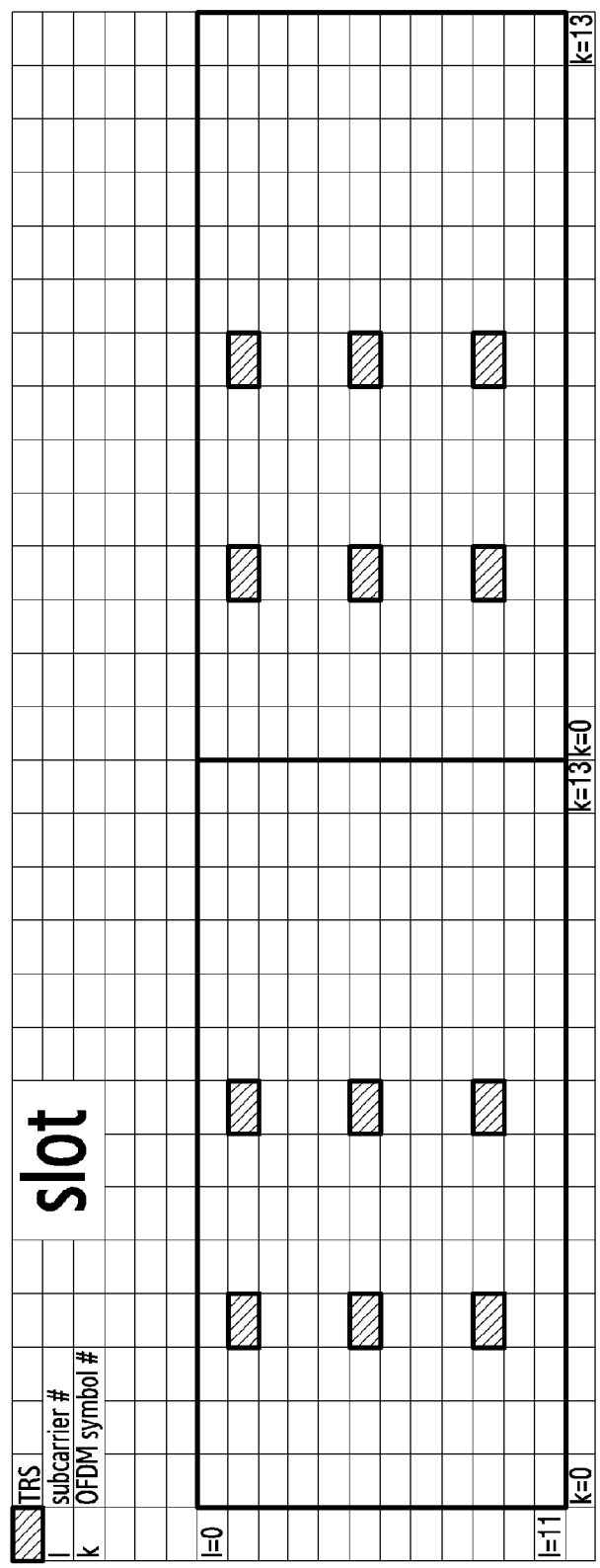

[Fig. 11]
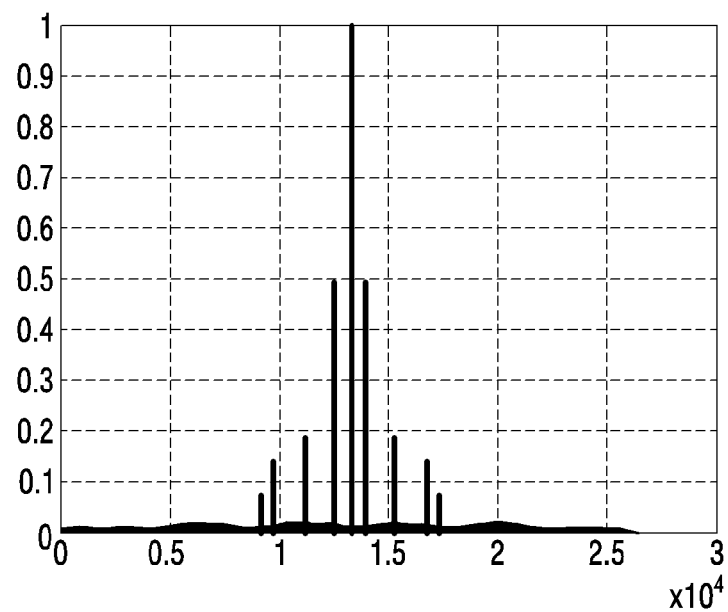

[Fig. 12A]
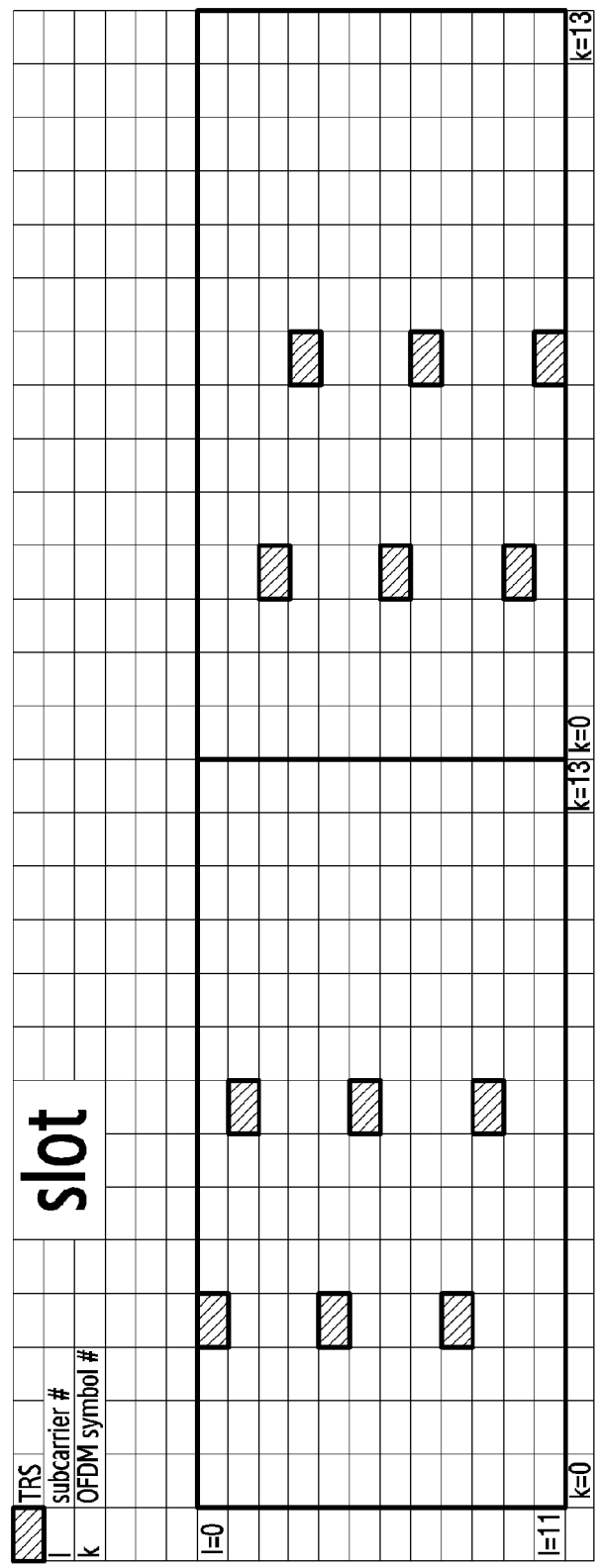

[Fig. 12B]
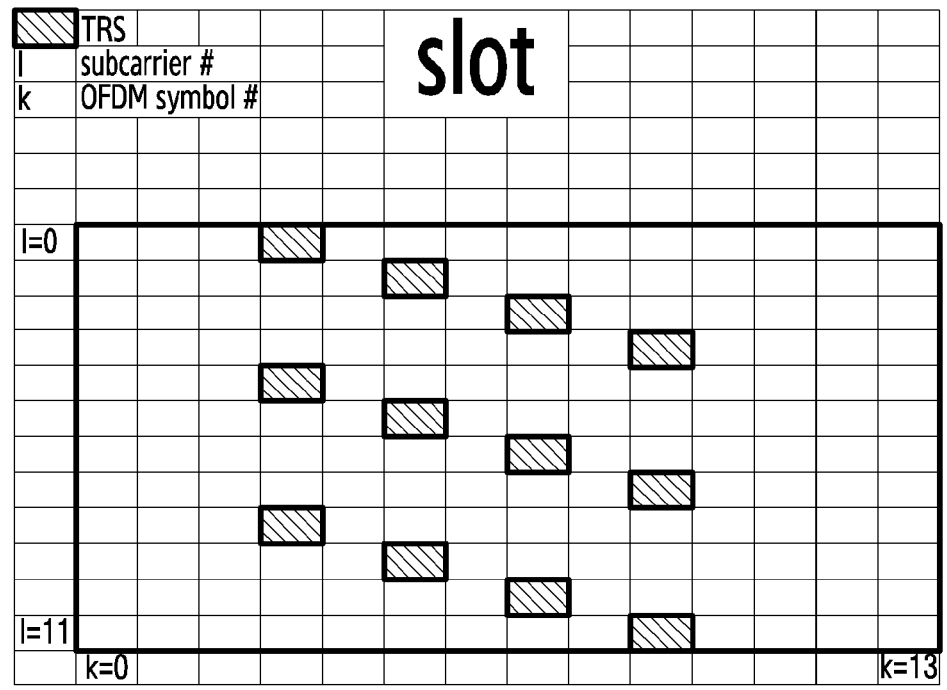
[Fig. 13A]
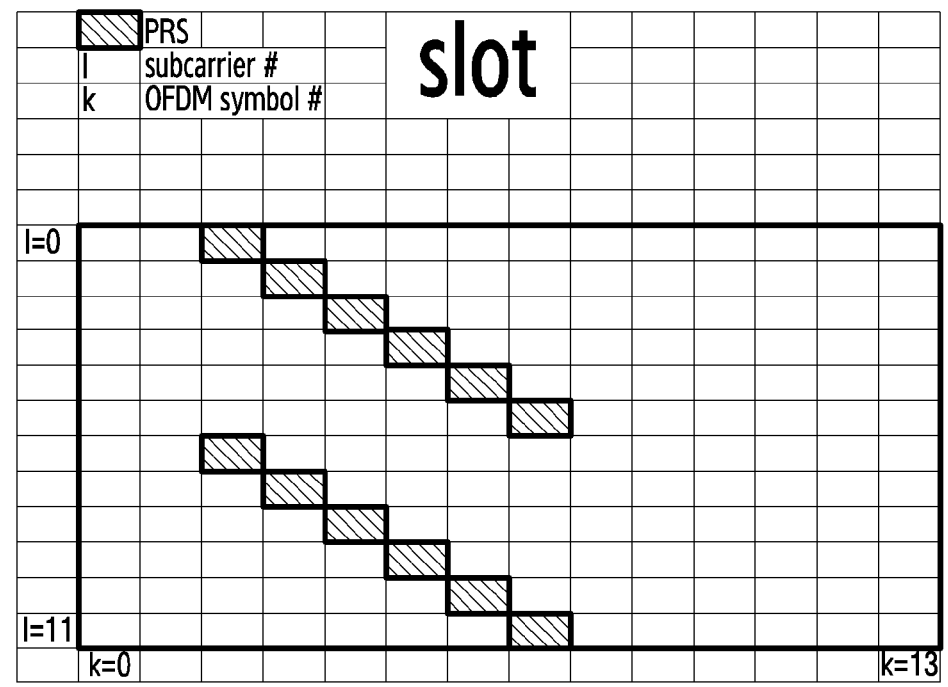

[Fig. 13B]
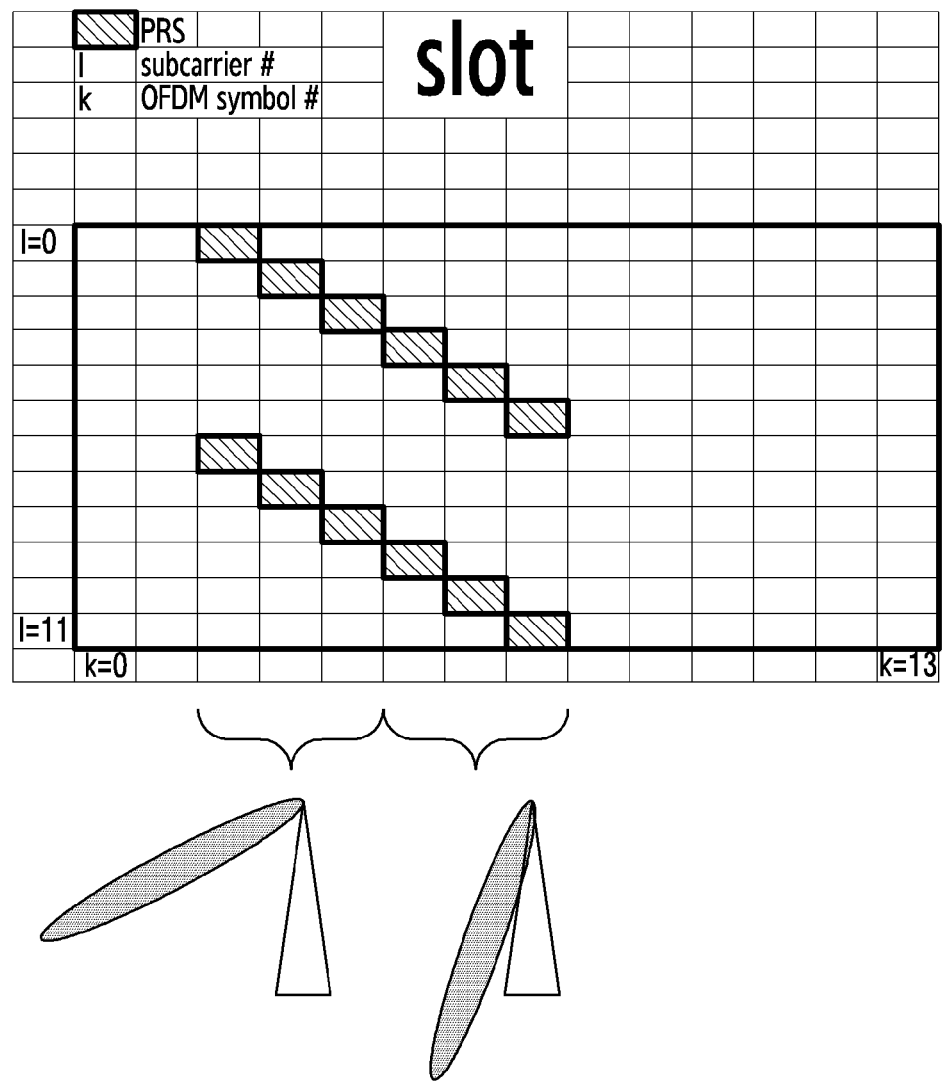

[Fig. 14]
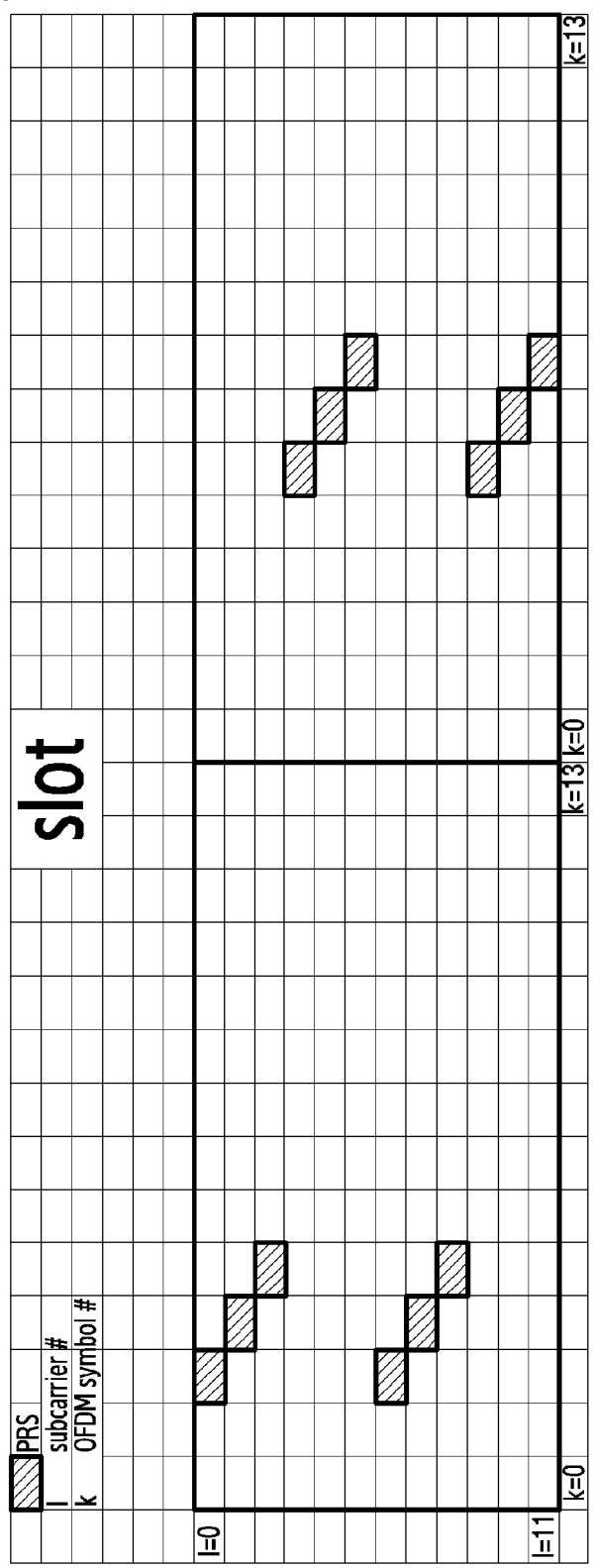

[Fig. 15]
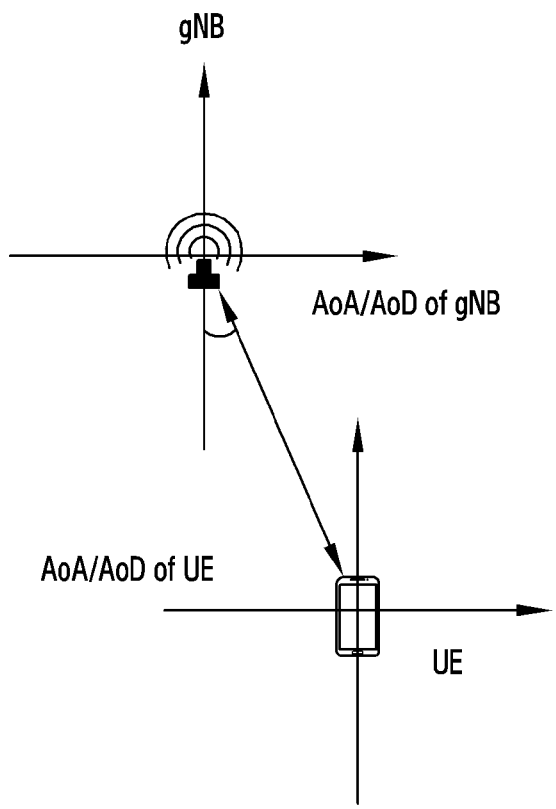

REFERENCE FEATURE SETS IN A TELECOMMUNICATION NETWORK

CROSS-REFERENCE TO RELATED APPLICATIONS

This application is a 371 of International Application No. PCT/KR2019/014848 filed on Nov. 4, 2019, which claims priority to United Kingdom Patent Application No. 1817967.1 filed on Nov. 2, 2018, United Kingdom Patent Application No. 1817925.9 filed on Nov. 2, 2018, and United Kingdom Patent Application No. 1915888.0 filed on Nov. 1, 2019, the disclosures of which are herein incorporated by reference in their entirety.

BACKGROUND

1. Field

The disclosure relates to improvements in the area of User Equipment (UE) capabilities in a telecommunication network. It relates particularly, but not exclusively, to Fifth Generation (5G) or New Radio (NR) systems but may find uses in other systems.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

A User Equipment (UE) capability information message includes a list of containers, each including the capabilities of one Radio Access Technology (RAT), such as EUTRA, NR or Multi-RAT Dual Connectivity (MRDC)

To retrieve the 3 capabilities, in the case of a UE supporting EUTRA, NR and MRDC, one or more messages requesting such info may be required from the network. The amount of capability information involved is relatively large and may not fit in a single message, where a 9K limit applies.

Means have been introduced by which the network can avoid transfer of capabilities not (currently) required by a network, using so-called network control fields. As such, the network can e.g. indicate requested bands, in which case the UE indicates supported band combinations (BC) only, comprising these requested bands.

To accommodate UE implementation flexibility, many UE capabilities are signalled per band or per band of a band combination. However, in practice, such UE capabilities are often the same in each case. Hence, it has been agreed not to repeat all parameter values for each band or band of a band combination, but instead to refer to (or index) separately certain defined parameter value combinations (feature sets). This avoids duplication or at least reduces redundancies.

Feature sets may have two effective levels. At a first level, a feature set is a list with each entry being a combination of (UE capability) parameter values, indicating which features a UE supports, as well as certain further characteristics e.g. MIMO layers. This is used to indicate the UE capabilities for a band of a band combination.

At a second level, a feature set combination is a list with each entry being a combination of feature set entries. This is used to indicate the UE capabilities for a band combination i.e. covering all bands of the band combination, comprising multiple feature sets.

A complication in the use of feature sets arises in the use of MRDC. This is a form of Dual Connectivity (DC) where a first connection is controlled by a Master Node, involving a Master Cell Group including cells using a first RAT and a second connection controlled by a Secondary Node, involving a Secondary Cell Group including cells using a second, possibly different RAT. For instance, this could be EN-DC with EUTRA used for MCG and NR used for SCG.

Feature sets are currently included in capability containers of the particular RAT i.e. EUTRA and NR (but not in MRDC). Feature sets have previously been considered to be quite RAT specific, so a node of a certain RAT should not be required to comprehend feature sets of other RATs.

In some circumstances, NR feature set entries are used or referenced in supported band combinations. Nodes of a certain RAT need to configure measurements towards another RAT, so they require basic knowledge of other RAT's band/band combinations supported by the UE i.e. in case of dual connectivity involving an EUTRA and an NR network node, both nodes need to be aware of the band combinations comprising bands of these two RATs, also referred to as MRDC band combinations. Such band combinations are included in a separate UE capability container i.e. with RAT type set to MRDC (i.e. the MRDC capabilities). EUTRA feature sets are currently referenced in MRDC capability container only.

An entry in a feature set does not have its own identity i.e. it is referred to by its position in the list (i.e. its index) e.g. 5 for the 5th entry in the list.

FIG. 1 shows the basic form of feature sets, feature set combinations in relation to certain band combinations. The UE will report a list of feature sets with each entry indicating a list of features that the UE supports e.g. 4-layer MIMO supported.

A band combination (BC) points to a feature set combination (FSC) that has an equal number of entries (bands) i.e. using an index. Multiple BCs should point to the same FSC, meaning that FSC re-use is expected.

An FSC has, for each band, a pointer to a feature set (FS). The same feature set is expected to be re-used for the same band in other BCs. The same feature set is expected to be re-used for other bands i.e. FS re-use is expected.

A problem, as mentioned above, is that it is desirable to retrieve capability containers separately, but that the containers may not fit in a single message, thereby increasing the signalling overhead of the system. Avoiding dependencies by making containers self-contained eases procedures but this is a significant change over the prior art that may result in unnecessary duplication.

Further, when the UE moves to an area using different bands, some of the containers may need to be replaced, unless the network requests capabilities for all bands used in the public land mobile network (PLMN).

FIG. 2 shows 3 capability containers: one each for EUTRA, MRDC and NR. This shows the inter-relationship between FS, FSC and BC in each case.

FIG. 3 shows example message sequences, comprising 4 steps:

Request LTE Stand Alone (SA) capabilities
Request LTE feature sets for MRDC
Request NR SA capabilities including MRDC feature sets
Request LTE MRDC capabilities The network can either: combine step 1 and 2 i.e. single request covering both; or use separate requests and merge two LTE containers.

In any event, the triplet of resulting containers has to be consistent i.e. Feature sets in LTE and NR containers should be consistent with references in MRDC containers.

Embodiments of the disclosure aim to address shortcomings in the prior art, whether disclosed herein or not.

The disclosure further relates to improvements in a positioning and measurement system in a telecommunication network. It relates particularly, but not exclusively, to Fifth Generation (5G) or New Radio (NR) systems.

Demand for mobile services is growing rapidly and one of the fastest growing segments is Location Based Services (LBS), primarily driven by two major requirements: emergency services and commercial applications. In response to these needs, second and third generation networks (WCDMA, GSM, CDMA) have added support for several positioning technologies, which vary in their accuracy and Time to First Fix (TTFF) performance. 3GPP Release 9 for LTE defines support for positioning technologies: Extended Cell ID (ECID), Assisted Global Navigation Satellite System (A-GNSS), Observed Time Different Of Arrival (OT-DOA) and LTE Positioning Protocol (LPP), a new positioning protocol. A new reference signal, i.e., positioning reference signal (PRS) has been defined in LTE. Further in Release-11, Uplink Observed Time Different of Arrival (UTDOA) has been adopted using SRS measurement. 3GPP Release-15 defines support for some RAT-independent positioning techniques, such as Real Time Kinematic (RTK) GNSS, to improve the accuracy of LTE positioning.

Embodiments of the disclosure aim to address problems with the prior art, whether mentioned here or not.

According to the disclosure there is provided an apparatus and method as set forth in the appended claims. Other features of the invention will be apparent from the dependent claims, and the description which follows.

According to an aspect of the disclosure, there is provided a method of operating a telecommunication network, in communication with a User Equipment, UE, comprising the use of Feature Sets, FS, wherein the telecommunication network is operable in a Dual Connectivity, DC, mode to support a first Radio Access Technology, RAT, and a second RAT, comprising the step of: the UE providing a UE capability container including a list of supported Band Combinations, BCs, for which Carrier Aggregation, CA, is supported.

In an embodiment, the list further includes supported BCs for which CA and DC is supported.

In an embodiment, UE capabilities for a BC supporting CA and DC modes are indicated by a single field.

In an embodiment, the single field includes an indication whether the UE supports DC for a particular BC and, if so, whether the UE capabilities for DC are the same as UE capabilities for CA.

In an embodiment, if the UE capabilities for DC are not the same as UE capabilities for CA, then the single field indicates the difference such that absence of the single field indicates that the UE capabilities for DC are the same as UE capabilities for CA.

According to an aspect of the disclosure, there is provided a method of operating a telecommunication network, in communication with a User Equipment, UE, wherein the telecommunication network is operable in a Dual Connectivity, DC, mode to support a first Radio Access Technology, RAT, and a second Radio Access Technology, RAT, comprising the steps of: the UE providing capability containers associated with operation according to the first RAT, operation according to the second RAT and operation according to DC involving the first RAT and the second RAT; and wherein the capability containers associated with operation according the first and second RAT comprise feature set, FS, information that is associated with band combinations included within the capability container associated with operation according to DC, whereby network operation utilizes a consistent set of the capability containers.

In an embodiment, setting contents of the capability containers is dependent upon controls set by the telecommunication network when requesting the UE to provide one or more capability containers, using controls relevant for a single capability container as well as controls relevant for multiple capability containers, wherein the controls may comprise requested frequency bands that affect which band combinations and feature sets are to be included in the capability containers.

In an embodiment, the Feature Sets in the capability container associated with operation according to the first RAT and in the capability container associated with operation according to the second RAT, include no feature sets for supported DC bands if DC requested bands is absent.

In an embodiment, the UE includes the capability container associated with operation according to the first RAT and the capability container associated with operation according to the second RAT only if explicitly requested.

According to an aspect of the disclosure, there is provided a method of operating a telecommunication network, in communication with a User Equipment, UE, comprising the use of Feature Sets, FS, wherein the telecommunication network is operable in a Dual Connectivity, DC, mode to support a first Radio Access Technology, RAT, and a second Radio Access Technology, RAT, comprising the steps of: ensuring that information in a plurality of capability containers is maintained in a consistent manner.

In an embodiment, the plurality of capability containers includes a capability container related to a first RAT, a second RAT and a DC mode.

In an embodiment, in order to maintain the capability containers in a consistent manner, a Radio Access Network, RAN, uploads/forwards the plurality of capability containers as a triplet.

In an embodiment, if an originating node has an incomplete or inconsistent set of the three capability containers, the uploading/forwarding is suppressed.

In an embodiment, if an originating node has an incomplete or inconsistent set of the three capability containers, then the incomplete or inconsistent set are forwarded with either the originating node providing an indication of incompleteness or inconsistency or a destination node detecting incompleteness or inconsistency; and the destination node taking action to recover.

In the foregoing, uploading concerns a transfer to CN and forwarding concerns transfer to another RAN node.

According to an aspect of the disclosure, there is provided a method of operating a telecommunication network, in communication with a User Equipment, UE, comprising the use of Feature Sets, FS, wherein the telecommunication network is operable in a Dual Connectivity, DC, mode to support a first Radio Access Technology, RAT, and a second Radio Access Technology, RAT, comprising the steps of: the telecommunication network storing multiple different version of capability containers which each store a subset of the UE capabilities.

In an embodiment, controls set by the telecommunication network in order to indicate which subset of the UE capabilities the UE is requested to provide.

In an embodiment, an identifier not only corresponds to a particular portion/subset of the UE capabilities, but also to the corresponding network controls used to obtain the the UE capability subset in question.

In an embodiment, an identifier is provided as part of a Radio Access Node, RAN, capability transfer procedure such that a particular version of the subset of UE capabilities is transferred.

In an embodiment, a reference capability container is provided which include capabilities common to all capability containers which include a subset of UE capabilities.

In an embodiment, the reference capability container is transferred separately from the subset of UE capabilities.

According to an aspect of the disclosure, there is provided a method of managing UE capabilities in terms, particularly, of feature sets (FS) and feature set combinations (FSC) in a telecommunication network. In particular, the management of FSs and FSCs may comprise the use of consistent containers or independent containers and embodiments relating to each option are disclosed.

According to another aspect of the disclosure, there is provided a method of transferring of partial UE capability information between UE, RAN and CN.

In an embodiment, this comprises transfer of LTE, NR and MRDC capability containers.

In an embodiment, this comprises using different options for network to control which part(s) to include in each container.

In an embodiment, this comprises aspects primarily related to radio interface.

In an embodiment, this comprises independent control of bands for SA and (MRDC-SA)

In an embodiment, this comprises control of setting supported band combinations and feature set information.

In an embodiment, this comprises control of feature set information relating to MRDC and/or SA.

In an embodiment, this comprises controlling when UE capability containers are transferred by separate messages.

In an embodiment, this comprises where feature set information covers bands indicated in same and/or other capability containers.

In an embodiment, this comprises a mechanism to avoid duplication of (feature set) information.

In an embodiment, this comprises use of partial UE capabilities within RAN and CN enabling transfer and CN storage of multiple versions In an embodiment, this comprises network operations upon change to other partial UE capabilities.

In an embodiment, this comprises network operations prior to/upon involving a node requiring different partial capabilities.

In an embodiment, this comprises use for NR of a supported band combination list covering CA and DC enabling indication of difference in capabilities between CA and DC.

According to an aspect of the disclosure, there is provided a method of configuring reference signals for positioning, within a telecommunication system, wherein a transmitter in the telecommunication system is arranged to transmit data arranged into a plurality of slots, with each of the plurality of slots comprising a plurality of symbols and a plurality of subcarriers, whereby over a certain number of slots, a majority of the plurality of subcarriers include a reference signal for positioning.

In an embodiment, the reference signal for positioning is one of PRS and TRS.

In an embodiment, the majority of the plurality of subcarriers is all of the plurality of subcarriers.

In an embodiment, a pattern and/or density of reference signals for positioning in configured by means of Positioning Protocol, LPP, and/or Radio Resource Control, RRC, and/or Downlink Control Information and/or Physical Downlink Control Channel, DCI.

In an embodiment, the configuration comprises a number indicating the number of symbols to include reference signals for positioning or a bitmap indicating the symbols to include reference signals for positioning.

In an embodiment, only Line of Sight, LOS, links are considered when determining User Equipment, UE, position.

In an embodiment, a link is determined to be LOS if Angle of Arrival, AoA, at one entity substantially equals Angle of Departure, AoD, at another entity, wherein each entity is either a UE or a base station, gNB.

In an embodiment, a link is determined to be LOS according to measurements made and reported by a UE and a gNB respectively.

In an embodiment, 3D positioning is performed by means of taking vertical AoA measurements.

In an embodiment, the degree of quantization is selected according to the positioning accuracy required.

According to an aspect of the disclosure, apparatus is provided, arranged to perform the method of a preceding aspect.

In an embodiment, a telecommunication system is provided comprising the apparatus of a preceding aspect.

Although a few preferred embodiments of the disclosure have been shown and described, it will be appreciated by those skilled in the art that various changes and modifications might be made without departing from the scope of the invention, as defined in the appended claims. Reference is also made to the appendix to this description which included further or supplemental technical information.

BRIEF DESCRIPTION OF THE DRAWINGS

For a better understanding of the invention, and to show how embodiments of the same may be carried into effect, reference will now be made, by way of example only, to the accompanying diagrammatic drawings in which:

FIG. 1 shows a general representation of Feature Sets and Feature Set Combinations;

FIG. 2 shows an inter-relationship according to an embodiment of the disclosure;

FIG. 3 shows a message exchange according to an embodiment of the disclosure;

FIG. 4 shows an inter-relationship according to an embodiment of the disclosure;

FIG. 5 shows network control options according to an embodiment of the disclosure;

FIG. 6 shows examples of Band Combinations in relation to certain Feature Sets;

FIGS. 7a and 7b show example feature sets according to an embodiment of the disclosure;

FIG. 8 shows a message exchange according to an embodiment of the disclosure;

FIG. 9 shows a message exchange according to an embodiment of the disclosure;

FIG. 10 shows TRS configuration according to the prior art;

FIG. 11 shows side correlation peaks, illustrating a problem in the prior art;

FIGS. 12a and 12b show modified TRS configurations according to an embodiment of the invention;

FIGS. 13a and 13b shows a modified PRS configuration according to an embodiment of the invention;

FIG. 14 shows a modified PRS configuration according to a further embodiment of the invention; and FIG. 15 shows LOS determination according to an embodiment of the invention.

DETAILED DESCRIPTION

Embodiments of the invention provide at least two distinct approaches to addressing problems in the prior art. In the following these are referred to as first and second major embodiments. Within each of these major embodiments, other possible options exist and these are described as appropriate.

The term EN-DC refers to Dual Connectivity with an EUTRA eNB acting as Master Node and an NR gNB acting as Secondary Node. It merely concerns one specific example of MRDC. When EN-DC is mentioned it is mainly by example i.e. use of the same for other MRDC cases is not excluded.

In the first major embodiment, consistent containers are provided. This approach is illustrated in FIG. 2. This enables consistency between the capability containers i.e. it ensures that feature sets in LTE and NR containers include the feature set entries referenced in the MRDC BCs included in the MRDC container. When requesting capabilities of NR or LTE, the network indicates the EN-DC BCs for which UE should (also) provide feature sets.

However, there are issues with this approach, including: how to use existing controls or any new signaling required; how precisely should the UE behave in response to these controls; and how should network apply the controls? These issues will be addressed in the following.

In the second major embodiment, independent containers are provided and this is illustrated in FIG. 4. Here, in contrast to the first embodiment, feature sets are added to the MRDC container. The UE sets feature sets in this container according to MRDC specific controls or request fields. FIG. 4 shows that the MRDC container includes feature sets for both EUTRA and NR, which contrasts to the approach shown in FIG. 2.

However, there are issues with this approach. One such issue is If the same feature set is used for an NR and MRDC BC, it will be included in both containers i.e. there will be duplication. Also, there may be additional controls required when requesting MRDC and other containers.

Returning to the first major embodiment, more details will now be presented. In this embodiment, feature sets remain in the container where they would previously have belonged (in the prior art). The network is able to request containers separately, whilst at the same time ensuring that containers are consistent. It should, in other words, be possible to retrieve feature sets covering bands/BCs for both standalone (SA) and MRDC operation, without the network having to do complicated operations such as re-building references and/or linking.

If the network indicates requested MRDC bands, the UE responds and includes all feature sets referenced in the supported BCs comprising these MRDC bands i.e. Note that in current standards feature sets are used for NR and MRDC BCs, but not for LTE BCs.

In the case where UE capabilities are transferred in LTE, the UE determines MRDC BCs i.e. supported BCs limited or filtered according to the requested MRDC bands (requestedFreqBandsNR-MRDC). Note that there is only one field (requestedFreqBandsNR-MRDC) that can be used to filter both NR and MRDC BCs. The UE includes feature sets referenced in the set of MRDC BCs determined as above. In the NR container, the UE does not include the supported MRDC BCs.

In the case where UE capabilities are transferred in NR, a similar regime applies. Again, the UE determines MRDC BCs as above and the UE similarly determines the supported NR BCs. Note, however, that there are separate fields to filter the NR and MRDC BCs. The UE now includes feature sets referenced in the set of MRDC BCs determined as above, as well as feature sets referenced in the set of NR BCs determined in a similar manner.

The first embodiment includes several refinements which will be details in the following. These include:

Refinement 1.1: Within LTE RRC, introduce filtering (requested band list) for NR separate from MRDC i.e. introduce 2 separate fields. This may be useful when certain bands are used for NR SA only but not for MRDC. Note more filters may also be included.

This may be achieved by adding reqFreqBandNR within LTE RRC. This has the effect of extending UECapabilityEnquiry by the addition of reqFreqBandNR i.e. a separate filter for NR.

This affects the NR capability container i.e. the fields: supportedBandCombinationList (in rf-Parameters) and featureSets. If present, the UE includes supported BCs comprising NR bands included in requestedFreqBandNR and feature sets referenced in these BCs. If absent, however, the UE includes all supported NR BCs (i.e. no filtering occurs) and feature sets referenced in these BCs.

Refinement 1.2: Introduce sufficient control so that the network can ensure that the UE provides required feature sets. This includes two further options:

Option 1: Introduce separate field by which network can explicitly request UE to include feature sets for supported MRDC bands so that, when set, absence of the MRDC band list results in inclusion of all supported MRDC bands.

Option 2: For setting feature sets in LTE and NR containers, include no feature sets for supported MRDC bands if MRDC requested bands is absent.

In this refinement the precise operations of the mobile are defined in response to the main network controls, such that appropriate UE capability containers are produced in the different use cases (i.e. MRDC-only, SA and both as discussed below). These operations are defined taking into account the field ENDC-Only (also referred to as MRDC-Only) and the field requestedFrequencyBandsMRDC (also referred to as reqFreqMRDC), and possibly a new, to-be-introduced field, MRDC-Also (as described below).

In this refinement, it is possible to control reporting of capabilities for SA, MRDC only or both. This involves defining means to ensure that the UE sets contents of NR and LTE containers to include relevant feature sets and define means to ensure that the UE sets contents of NR and LTE containers as follows:

MRDC only: only include feature sets referenced in supported MRDC band combinations only.

SA: include all capabilities only relevant for SA, including feature sets referenced in supported Carrier Aggregation (CA) band combinations.

Both: include all capabilities i.e. covering both MRDC only and SA, as above.

It is important to note that the UE includes NR and LTE containers only when explicitly requested i.e. the UE does not, e.g. autonomously, provide an LTE capability container with MRDC only contents (e.g. feature sets for MRDC) if network only requests an MRDC container.

When requesting LTE and NR containers, the network may indicate MRDC bands to be considered when setting feature sets. There are then 2 options. The first is that absence of the requested MRDC bands field indicates that the UE includes feature sets for all supported MRDC BCs. This option implies that there is a need for another field by which network can indicate if it wants the UE to also include feature sets for MRDC BCs. The second option is that absence indicates that the UE does not include feature sets for MRDC.

EN-DC/MRDC-only controls whether the UE should include SA related information. If this is set, the UE omits, and only includes, MRDC related information i.e. feature sets for EN-DC BCs.

FIG. 5 shows a summary of the network control options, according to Options 1 and 2 referred to above.

For Option 1, include feature sets for MRDC if MRDC bands are present. The following cases call for setting of LTE or NR container:

SA: network omits reqFreqMRDC, UE ignores MRDC-Only

MRDC only: network includes reqFreqMRDC and MRDC-Only

Both: network includes reqFreqMRDC and omits MRDC-Only

In options "MRDC only" and "Both", the UE includes feature sets for supported MRDC BCs comprising requested MRDC bands. In the option "SA" and "Both", the UE includes SA capabilities.

For Option 2, include feature sets for MRDC, based on a new field (referred to as MRDC-Also). The following cases call for setting of LTE or NR container:

SA: network omits reqFreqMRDC and MRDC-Also and UE ignores MRDC-Only

MRDC only: network includes MRDC-Only and may include reqFreqMRDC and MRDC-Also (UE may ignore)

Both: network omits MRDC-Only, includes MRDC-Also and may include reqFreqMRDC

In options "MRDC" and "both", the UE includes feature sets for either all supported MRDC BCs or supported MRDC BCs comprising requested MRDC bands. In options "SA" and "both", the UE also includes SA capabilities.

Refinement 1.3: Network rules may be defined to manage dependencies and to ensure the set of UE capability containers is set consistently. If the network wants to issue a request with a different filter for NR capabilities, it may have to re-request the MRDC capabilities also, as the feature sets referenced in the BCs within this container may no longer be consistent with feature sets in new NR capabilities container.

The use of signalling/procedures is generally set by network implementation, but some aspects/rules can be defined.

It is possible to consistently set network request fields, using a separate request for NR and MRDC capabilities if:

complete feature set: network always requests UE to include feature sets for all relevant MRDC and NR bands; or merging SA and MRDC (LTE): network can merge feature set received in LTE container including feature sets for all relevant MRDC bands with LTE containers not including feature set.

It is instructive to consider what the network should do with the container triplet (i.e. LTE, MRDC, NR) upon moving to an area using different network request fields (i.e. different partial capabilities) e.g. when a different set of requested bands apply in the new area. When changing to an area with other requested bands, the network may have to discontinue using the LTE, NR and MRDC containers, as change of one container may result in the triplet being inconsistent (e.g. BCs in one container may not reference to the correct feature sets info in another container anymore). If different LTE bands are used in the new area, only the LTE container is to be discarded/replaced. If different NR bands are used, both LTE and MRDC containers are to be discarded/replaced. There may be some exceptions e.g. if the index of feature sets referenced in MRDC BCs remain the same. If MRDC bands change, the triplet is to be discarded/replaced.

When it comes to the uploading/forwarding of containers (triplet), the RAN has to upload a consistent triple of capability containers to CN. It is noted that in some cases, there may be no real need to replace the entire triplet (see above).

The Core Network (CN) has certain operational options. Assuming storage of single set of containers (multiple partial containers are addressed later), then the RAN always replaces the triplet together, even if replacement of a single container would be sufficient. Alternatively, the RAN may only replace the containers to be updated, but ensures that after each upload the set stored by CN is consistent.

Similar considerations apply to forwarding of capability containers to other RAN nodes (assumed to be done only at initial setup of SCG/SN and upon change of MN/SN) and these include:

the (originating) RAN node that forwards should always ensure that the set of containers that is provided is consistent. If the originating node has an inconsistent set, it may suppress capability forwarding; or the (originating) RAN node may forward an incomplete/inconsistent set, with:

Originating node providing indication

Destination node detecting incompleteness/inconsistency

In both cases, destination nodes takes subsequent actions to recover.

There may, however, also be cases in which the originating RAN node has to retrieve the partial capabilities required by the second/target RAN node before initiating its configuration. It may be possible for the originating mode to initiate some time in advance e.g. when configuring measurements to accommodate configuration of the second/target RAN node.

Refinement 1.4: Delta signaling. If the UE is merely adding entries to a feature set, it omits feature sets that are the same as indicated previously. In other words, the UE only signals additional and/or changed entries together with an offset indicating a position where the first additional and/or changed entry is to be placed, meaning that entries prior to that are the same as indicated before.

Returning to the second major embodiment, there are certain advantages associated therewith. Each capability container is self contained i.e. it includes all feature sets that are used by the Feature Set Combinations included in that container.

However, there are certain issues associated with this approach. These issues include the following:

Quite a few feature sets may be duplicated i.e. included in both NR and MRDC capabilities i.e. for same combination of NR bands (as controlled by the same/consistent requestedBands field)

Supported BCs are also duplicated

Duplication is maximal if:

all NR BCs can be supported with LTE BCs i.e. full independence, although it seems more likely that certain combinations are not possible or Baseband process is independent also i.e. feature sets supported for NR do not depend on features supported for NR, unless different hardware is supported for baseband also, it seems more likely that there is some dependency There are means to avoid duplication. These include:

importing feature sets included in NR container that apply for MR-DC. It may be sufficient to do this kind of importing in one direction only A block of imported feature sets (e.g. starting from entry N to entry M) may be inserted at a particular position e.g. K. In principle it may be possible to import multiple such blocks of feature sets Options for importing include, in the simplest form, importing one block from entry 0 to M and insert these at the start (or end). More complicated models (i.e. with offsets and multiple blocks) may be useful e.g. if entries later in the list would correspond to feature sets requiring more baseband processing.

The table at FIG. 6 illustrates how duplication may be avoided.

This illustrates various feature sets (FS) in relation to LTE bands L1 and L2 and NR bands N1, N2 and N3 in various combinations.

LTE is associated with four feature sets: FS-L1 to FS-L4. L1 has the highest capabilities (the best performance and is most demanding in terms of baseband processing). NR is associated with 7 feature sets: FS-N1 to FS-N7.

Band relations can be defined as one of conflicting, independent or dependent:

Conflicting: There are certain bands which cannot be configured together, due to certain conflicts e.g. L2 and Nx, perhaps due to RF limitations.

Independent: There are bands for which the configuration supported by the UE is independent of what is simultaneously configured for the other (independent) band. Example: (L1, N2), (L1, N3), (N1, N2), (N1, N3)

Dependent: There are bands for which the configuration supported by the UE depends on what is simultaneously configured for the other (dependent) band. Example: (L1, L2), (L1, N1), (N2, N3)

In terms of feature set usage, NR BCs in the NR container include FS-N1 and FS-N2. MRDC BCs in the MRDC container include FS-N1, FS-N2 and FS-N3. Both FS-N1 and FS-N2 are duplicates. This example illustrates a more significant FS re-use than would typically be expected.

FIGS. 7a and 7b show further details of feature sets.

In FIG. 7a, the is illustrated a simple example based on the table of FIG. 6. Here, feature sets are only provided for requested bands L1, L2, N1, N2 and N3. The entries included in the dashed box indicate duplicate entries.

Instead of including duplicates, the UE provides an indication that a block of the FS is the same as in another container by, for instance, providing start position/ offset and number (0 and 2 in this case). It is possible to import from NR to MRDC or vice-versa as required.

In the case that the NR imports from MRDC, with in the NR container, the UE indicates start position/offset and number of entries in other (MRDC) container i.e. 0 and 2 in this particular example.

In FIG. 7b, is illustrated a more complex example. In this case, there are two blocks which may be imported. Again, the duplicate entries are indicated by the dashed boxes.

In the case that NR imports from MRDC, there is a need to provide, per block of entries to be imported, target details (i.e which entries to import from other container i.e. start position/offset and number of entries in other (MRDC) container) and placement details (i.e. where the imported block is to be placed so that it is clear which indices is used for the imported entries and subsequent entries). On way to do this is that within the feature list either the feature details are specified, or import details are provided. i.e. for entry 3, feature set parameters are not signaled but instead the details of the target entry/block to be imported are signaled.

In another case where the NR imports from MRDC, within the NR container, the UE indicates details of the two blocks to be imported. For example, for block 1, the target details are start position=0 and number of entries=2 and placement details are start position=0.

It should be noted that the aim of avoiding duplication somewhat defeats the purpose of providing independent containers. It should be noted that duplication avoidance is of use on Uu interface (air interface) only. The radio interface is a primary target for signaling optimizations and so any steps which can reduce signaling overhead here are desirable. In the network, duplicate containers may be generated to ease subsequent handling, since there is less need to avoid duplication in this context. This approach can hence also be regarded as one in which UE provides assistance making it much easier for network to re-build a complete feature set (and one in which references need not be updated).

When requesting UE capabilities, RAN may request the UE to provide partial capabilities only, such as capabilities related to bands used in (part of) the network. When the UE moves to another network node, RAN may request the UE to provide another set of partial capabilities e.g. if the bands used in different parts of the PLMN are not the same.

RAN may use different versions of the LTE, NR and or MR-DC capability containers e.g. in different parts of the network. It may be possible that the network may store multiple different versions of the capability containers, each including a subset of the UE capabilities. Storing different versions of partial UE capabilities is not essential for REL-15 of the standard but may be introduced in a later release e.g. REL-16.

Procedures are defined by which the CN can store more than one copy of a UE capability container i.e. each carrying part of the capabilities. The handling by the CN should be as simple and, as much as possible, agnostic of RAN specifics e.g. details of the capability filtering used by RAN.

Which partial capability request a particular RAN node employs, as well as the corresponding identifier, can be configured by Operation, Administration and Maintenance (OAM). I.e. it may be used for purposes other than bands also e.g. different vendors may have support different functions and hence request different capabilities It may be desirable to add an identifier to the RAN capability transfer procedures, which is used both at upload to CN and when requesting CN to download a particular version of the partial capabilities e.g. using some version/index as an abstract (RAN agnostic) way of identifying a particular partial UE capability container.

Based on OAM, a first RAN node can know which partial capabilities are relevant for a target RAN node (change of Master RAN Node, MN) or secondary RAN node (configuration of DC/change of Secondary RAN Node, SN).

Overlap may be avoided by use of a reference container including capabilities common to all partial containers, e.g. identified by a specific ID. This may also affect procedures across the radio i.e. when requesting UE to filter, the network may indicate whether UE should omit baseline capabilities i.e. not affected by any filter.

FIG. 8 shows a message sequence detailing interactions between UE, RAN and CN. Note that the number of partial configurations is limited and configured by OAM. This includes network request/filters used within the network (area), including the partial capability version/index. One version/index corresponds to one setting of the network requests/filters.

The capability retrieval and upload example shown in FIG. 8 shows:

UE initiates connection establishment, during which it may indicate its UE (model) ID RAN requests CN to provide capabilities i.e. a particular partial capability version/index CN initiates context setup and indicates the requested capabilities are not available (e.g. by absence)

RAN requests the UE to provide the concerned partial capabilities, i.e. using a particular network request filter #1

UE provides requested UE capabilities (also returns the network request filter based on which it was compiled)

RAN uploads UE capability container to CN, together with the partial capability version/index FIG. 9 shows a further message exchange in connection with the transfer of partial configurations. The First node initiates configuration of a second node i.e. covering Handover from source (1st) to target (2nd) node Configuration by master (1st) node of secondary (2nd) node in case of dual connectivity Change from one secondary (1st) node to another (2nd) secondary node, again in case of dual connectivity Node initiating the change would perform role of 1st node (although the case that the master anyhow takes this role is not excluded)

Mobility to/configuration of other network node, advance retrieval involves:

First node may retrieve partial capabilities required by second node, e.g.

If first RAN node is aware of partial capabilities required by second node

If First node does not have concerned capabilities

If time allows

Retrieval may be initiated early e.g. when measurements are configured for change to/configuration of 2nd node Retrieval can be from CN (1a), and if unavailable in CN from UE (1b)

First node initiates preparation for configuration of 2nd node during which it provides capabilities to 2nd node Partial capabilities not required by 2nd node may be omitted First node might indicate that CN does not have required partial capabilities stored (i.e. if capabilities were not available in CN but first node did not managed to retrieve from UE)

Second node responds to configuration preparation request from source

If required capabilities were not provided during preparation, second node initiates retrieval from UE Notes It may be that first node can only initiate configuration of secondary node if it has (some of) the partial capabilities e.g. the capabilities concerning the RAT (primarily) used by the target Steps 2, 3 and 4 may be in other orders It may be that step 4 is actually performed via first node i.e. second node merely indicating the (partial) capabilities it requires while actual retrieval is performed by first node In relation to partial UE capabilities, it may be possible to use a common reference container. The basic idea is that different partial capabilities may share a significant part that is common to them all E.g. not affected by any network request/filtering.

This common (or baseline/reference) capability part can be signalled and stored separately from the partial capabilities. This is to avoid the common part being repeated for every partial capability transfer.

Whenever requesting the UE to provide capabilities, the network indicates whether to include or suppress capabilities common to all partial containers. If requested to provide the common capabilities, the UE either provides these capabilities in a separate container, or within the same container as used to carry the partial capabilities.

For upload/download to CN, the same applies i.e. the information may be provided in a separate container. When requesting capabilities from CN, RAN may request CN to include or suppress the common part.

A further aspect of embodiments of the invention is to avoid duplication of BCs of NR CA & NR DC. The NR capability container may be used to indicate band combinations for which NR DC is supported (i.e. together with BCs for which CA is supported).

Further, it cannot be assumed that a UE supports DC for the same BCs as for which UE supports CA. Still further, if UE supports DC for the same BC as for CA, it cannot be assumed that detailed UE capabilities supported for DC are exactly the same as for CA. In this embodiment, further details are presented regarding how UE indicates/signals such differences, (that are yet to be defined).

For CA and DC, BC is listed once in supportedBandCombination i.e. a single field is used to cover the supported BCs for CA and DC and that within this field indications are provided regarding whether UE capabilities for DC are different i.e. single list of supported BCs, and per entry in the list any differences are indicated. The following options are presented:

Option 1: For each entry in the (common) supported BCs, indicate differences as follows:

If DC is supported, UE includes a field to indicate support of DC

If the field indicating DC support is included, the UE can indicate a different feature set combination. Such a feature set combination is included if detailed capabilities are different i.e. absence implies the detailed capabilities are the same Option 2: For each entry in the (common) supported BCs, indicate differences as follows:

If DC is supported with equal detailed capabilities, UE includes a field to indicate equal support of DC If the field indicating equal DC support is not included, UE indicates a different feature set combination if detailed capabilities are different i.e. absence implies the UE does not support DC Differences between the options:

With option 1, the most efficient 1b signalling applies for no support of DC

With option 2, the most efficient 1b signalling applies for equal support of DC

Which option to select depends on which case is best optimized e.g. one that occurs most frequently.

In the following, Positioning Reference Signal (PRS) and Tracking Reference Signal (TRS) are referred to as specific instances of reference signals for positioning. The skilled person will appreciate that either of these or, indeed, a different signal will suffice and so when a generic reference is intended, the term "reference signal for positioning" will be used and this is intended to relate to PRS, TRS or some other signal, as required.

In prior art LTE systems, only one Positioning Reference Signal (PRS) pattern is defined. However, in NR, multiple PRS patterns/densities may be defined at least based on carrier frequency range, e.g., FR1 (<6 GHz) or FR2 (>24 GHz).

The main reason for this is that positioning accuracy depends on two factors: available bandwidth for positioning and numerology, i.e., subcarrier spacing (SCS).

In FR1, the available bandwidth for positioning is not always large especially considering the prevalence of Internet of Things (IoT) devices with 5MHz bandwidth. In addition, smaller SCS in FR1 also leads to lower positioning accuracy. In such cases, in order to achieve the required high degree of positioning accuracy, the density of PRS should, ideally, be high. On the contrary, the available bandwidth for positioning reference signals in FR2 is normally quite large and the larger SCS also improves positioning accuracy. In such cases, a lower density of PRS can be considered.

In a first embodiment, PRS pattern/density scales with carrier frequency and/or subcarrier spacing in a pre-defined manner (e.g. defined in a table), which can be configured by Positioning Protocol (LPP) and/or Radio Resource Control (RRC) and/or Downlink Control Information (DCI)/Physical Downlink Control Channel (PDCCH).

In a second embodiment, the LTE PRS pattern can be used with modification and Channel State Information Reference Signal (CSI-RS)/Tracking Reference Signal (TRS) can also be used with modification, e.g., LTE PRS for FR1 and Channel State Information Reference Signal (CSI-RS)/Tracking Reference Signal (TRS) for FR2.

In the second embodiment, LTE PRS does not occupy every subcarrier due to the existence of Cell Specific Reference Signal (CRS). However, in NR, there is no CRS and using the same pattern as in the prior art LTE system can cause a problem in that there are some subcarriers without PRS and this will lead to large side correlation peaks, which will significantly degrade positioning accuracy. Using CSI-RS/TRS will cause the same problem. TRS can be configured for 2 symbols in two consecutive slots with density 3 (in total 4 symbols for two slots) as shown in FIG. 10 with only 3 subcarriers are occupied.

The fact that not all subcarriers are occupied leads to large side correlation peaks as shown in FIG. 11. In situations with low Signal to Interference and Noise Ratio (SINR), the problem would be particularly pronounced.

In order to address the problem, the subcarrier used for CRS in LTE is used for PRS so that PRS can occupy all the subcarriers. For CSI-RS/TRS, a different frequency offset can be introduced so that TRS can occupy all the subcarriers in one slot or in multiple slots as shown in the FIGS. 12a and 12b.

In some circumstances, it may be acceptable to transmit PRS such that is occupies a simple majority of the available subcarriers. This would give an improved performance over the prior art situation, but the best performance is achieved by ensuring that each subcarrier includes PRS. The system designer can specify an acceptable level of performance and schedule PRS accordingly.

It can be seen in FIG. 12a that TRS is positioned such that, over 2 slots, TRS appears on each subcarrier. This is achieved by adjusting the placements of TRS compared to the prior art situation shown in FIG. 10, without increasing the actual number of TRS transmissions per se.

In FIG. 12b, the number of TRS transmissions per slot is increased, compared to FIG. 10. The effect is such that TRS is transmitted on every subcarrier by means of a repeating patters over 4 symbols.

The different configuration of TRS according to embodiments of the invention can be configured semi-persistently by upper layer signaling, e.g., LPP and/or RRC and/or dynamically by lower layer signaling, e.g. DCI.

One of the most important features used widely NR is beamforming, especially for FR2. In order to improve hearabilty, beam sweeping is utilized for the transmission of PRS. In addition, stringent latency requirements impose another limit to the duration of one positioning occasion. The number of symbols which can be used in one positioning occasion is made configurable in the following embodiments. Positioning occasion refers to the duration of local correlation to measure time difference of arrival (tdoa).

In a first embodiment, all the symbols for one positioning occasion are in the same slot as shown in FIG. 13a and the duration can be configured semi-persistently by upper layer signaling, e.g., LPP and/or RRC and/or dynamically by lower layer signaling, e.g. DCI.

In FIG. 13b, two different beam positions are shown, each associated with 2 different sets of 3 symbols. This results in 2 poisoning occasions within the slot shown.

In a second embodiment, the symbols for one positioning occasion occur across multiple slots as shown in FIG. 14 and the duration can be configured semi-persistently by upper layer signaling, e.g., LPP and/or RRC and/or dynamically by lower layer signaling, e.g. DCI.

In either case, the duration can either be signaled as a single value indicating the number of symbols with positioning or a bitmap indicating the symbols carrying PRS. For each positioning occasion, different beams can be supported as shown in the below figure.

The performance of positioning largely depends on Line of Sight (LOS) condition. It is implicitly assumed that all links are LOS links so that if any of the links is actually a Not LOS (NLOS) link, the positioning performance will be significantly degraded. Therefore, it is important to identify which links are NLOS links so that these links are not taken into consideration for positioning purposes.

One solution to determine LOS condition is to use Angle of Arrival (AoA) and/or Angle of Departure (AoD) information. Most of the user terminals (UE) are equipped with an Inertial Measurement Unit (IMU) sensor so that the UE antenna array orientation can be obtained.

The base station (gNB) antenna array orientation is fixed so this information is also available. With such information, it is possible to compare the AoA/AoD angle at the UE and gNB and if they match, e.g., AoA/AoD of gNB=AoA/AoD of UE, as shown in FIG. 15, the link is determined to be a LOS link and, if not, it is a NLOS link.

A first embodiment uses AoA/AoD measurement based solutions, and comprises two options.

Firstly, the gNB measures AoA; the UE reports its AoD; and the LOS decision is made at gNB if the AoA=AoD.

Alternatively, the UE measures AoA; the gNB reports its AoD; and the LOS decision is made at the UE.

A second embodiment uses beam measurement and report-based solutions. This, too, comprises two options.

Firstly, the gNB determines the reception beam and detects the UE transmission beam, and the LOS decision is made at gNB.

Alternatively, the UE determines the reception beam and the gNB signals its transmission beam, and the LOS decision is made at UE.

In each of these cases, one of the network entities makes the determination based on either AoA/AoD considerations or via reports and measurements. Which particular entity makes the LOS determination and which technique is to be used may be configured as required.

When the UE reports back its measurement results, e.g., time difference of arrival (tdoa)/time of arrival (toa) and AoA/AoD, the values are quantized, as in all in digital communications. The quantization granularity used determines the quantization error, which also impacts the positioning accuracy. Essentially, the higher the quantization granularity, the more accurate the positioning is. However, very high quantization granularity will also create a large signaling overhead and may increase the positioning latency. As such, the quantization granularity is determined by the required positioning accuracy. In an embodiment, multiple quantization granularities are supported. For cases where higher accuracy is required, a finer quantization granularity is configured and, for cases with a lower accuracy requirement, a coarser granularity can be configured to reduce signaling overhead. Such configuration can be done by upper layer signaling, e.g., LPP and/or RRC.

As mentioned, AoA measurements are performed to support positioning in NR. In order to support 3D positioning, vertical AoA measurement are required, in addition to measurements in the horizontal plane. Vertical AoA measurements may be defined as: the estimated angle of a user or network node, e.g., gNB with respect to a reference direction. The reference direction for this measurement shall be the geographical vertical to the ground, positive in a counter-clockwise direction.

The AoA is determined at the gNB antenna for an Uplink (UL) channel corresponding to a particular UE or at the UE antenna for a Downlink (DL) channel corresponding to transmitting gNB. It should be noted that AoA/AoD measurement can also be done via beams if, with each beam indication or report, the angle of the beam is also indicated or reported.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication system, the method comprising:
receiving, from a base station (BS) a UE capability enquiry; and transmitting, to the BS as a response to the UE capability enquiry, UE capability information associated with a band combination (BC) list, wherein, in case that a field for a first BC of the BC list is included in the UE capability information, the field for the first BC indicates support of a dual connectivity (DC) of a first radio access technology (RAT) and a second RAT, wherein in case that the field for the first BC includes a first feature set (FS) combination supported for the first BC, the first FS combination is associated with the DC, and wherein, in case that the field for the first BC does not include the first FS combination supported for the first BC, a second FS combination different from the first FS combination is applied to the DC for the first BC.

2. The method of claim 1, wherein the second FS combination is associated with a carrier aggregation (CA) for the first BC in the BC list.

3. The method of claim 2, wherein the BC list further includes a second BC supported for a CA.

4. A user equipment (UE) in a wireless communication, the UE comprising:
a transceiver; and
a controller coupled with the transceiver, and configured to:
receive, from a base station (BS) a UE capability enquiry; and
transmit, to the BS as a response to the UE capability enquiry, UE capability information associated with a band combination (BC) list,
wherein, in case that a field for a first BC of the BC list is included in the UE capability information, the field for the first BC indicates support of a dual connectivity (DC) of a first radio access technology (RAT) and a second RAT,
wherein, in case that the field for the first BC includes a first feature set (FS) combination supported for the first BC, the first FS combination is associated with the DC, and
wherein, in case that the field for the first BC does not include the first FS combination supported for the first BC, a second FS combination different from the first FS combination is applied to the DC for the first BC.

5. The UE of claim 4,
wherein the second FS combination is associated with a carrier aggregation (CA) for the first BC in the BC list.

6. The UE of claim 5, wherein the BC list further includes a second BC supported for a CA.

7. A method performed by a base station (BS) in a wireless communication system, the method comprising:

transmitting, to a user equipment (UE), a UE capability enquiry; and
receiving, from the UE as a response to the UE capability enquiry, UE capability information associated with a band combination (BC) list,
wherein a field for a first BC of the BC list is included in the UE capability information, and the field for the first BC indicates support of dual connectivity (DC) of a first radio access technology (RAT) and a second RAT,
wherein, in case that the field for the first BC includes a first feature set (FS) combination supported for the first BC, the first FS combination is associated with the DC, and
wherein, in case that the field for the first BC does not include the first FS combination supported for the first BC, a second FS combination different from the first FS combination is applied to the DC for the first BC.

8. The method of claim 7,
wherein the second FS combination is associated with a carrier aggregation (CA) for the first BC in the BC list.

9. The method of claim 8, wherein the BC list further includes a second BC supported for a CA.

10. A base station, BS, in a wireless communication system, the base station comprising:
a transceiver; and
a controller coupled with the transceiver, and configured to:
transmit, to a user equipment (UE), a UE capability enquiry; and
receive, from the UE as a response to the UE capability enquiry, UE capability information associated with a band combination (BC) list, wherein, a field for a first BC of the BC list is included in the UE capability information, and the field for the first BC indicates support of dual connectivity (DC) of a first radio access technology (RAT) and a second RAT,
wherein, in case that the field for the first BC includes a first feature set (FS) combination supported for the first BC, the first FS combination is associated with the DC, and
wherein, in case that the field for the first BC does not include the first FS combination supported for the first BC, a second FS combination different from the first FS combination is applied to the DC for the first BC.

11. The base station of claim 10,
wherein second FS combination is associated with a carrier aggregation (CA) for the first BC in the BC list.

12. The base station of claim 11,
wherein the BC list further includes a second BC supported for a CA.

* * * * *

UNITED STATES PATENT AND TRADEMARK OFFICE
CERTIFICATE OF CORRECTION

PATENT NO. : 12,127,285 B2  
APPLICATION NO. : 17/289988  
DATED : October 22, 2024  
INVENTOR(S) : Van Der Velde et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 667 days.

Signed and Sealed this  
Eighteenth Day of March, 2025

Coke Morgan Stewart  
*Acting Director of the United States Patent and Trademark Office*